Patented May 28, 1946

2,400,874

UNITED STATES PATENT OFFICE 2,400,874

RECOVERY OF CATALYSTS

Robert E. Burk, Cleveland Heights, Ohio, assignor to The Standard Oil Company, Cleveland, Ohio, a corporation of Ohio No Drawing. Application January 6, 1943,
Serial No. 471,453

19 Claims. (Cl. 23—205)

This invention relates to the recovery of fluorides, and more particularly to the recovery of catalysts comprising either hydrogen fluoride or boron trifluoride by means of an absorbent comprising an amine.

Hydrogen fluoride and boron trifluoride may be used to exert catalytic effects in certain chemical reactions, particularly reactions involving hydrocarbons. The particular reactions in which such catalysts are employed are not a part of this invention and therefore need not be referred to in any great detail. However, some of the products resulting from these reactions, or some of the starting components therein, may have the catalysts in admixture therewith in a physical or physio-chemical admixture or loose chemical combination, and it may be desirable to separate the catalyst from these products or components. This is of significance not only when the product or component is wanted free from the catalyst, but also when it is desired to separate the catalyst to prevent the loss thereof and for re-use, such as in a cyclic process. The latter aspect of the invention assumes particular importance when the catalyst is mixed with a product or component that is not to be re-cycled or is a waste product, and yet contains a significant amount of the catalyst so that its disposal would obtain a substantial loss of the catalytic material.

It has been discovered that hydrogen fluoride and boron trifluoride each form a complex with or is absorbed by amines under appropriate conditions and that this complex absorption product can be disassociated subsequently without further chemical treatment to release the fluoride from the amine under other appropriate conditions. This discovery is utilized in accordance with the invention to separate hydrogen fluoride and boron trifluoride by absorption from hydrocarbons or other chemical compounds with which the fluorides are mixed for the purpose of recovering fluorides for further use as a catalyst or for any other purposes.

Hydrogen fluoride boils at 67° F., and therefore when utilized in reactions at temperatures above room temperature it is gaseous unless maintained under suitable pressures. Boron trifluoride (B. P. —150° F.) is a gas unless liquefied by appropriate temperatures and pressures. Either of the fluorides alone, or with other chemical components may be used as a catalyst either in the liquid or gaseous phase depending on the reaction involved, and the conditions of temperature and pressure under which it is carried out. The products of the reaction, or the unreacted components, when released at any predetermined temperature and pressure may be liquid or gaseous or both, or the products or components in either form under such conditions may contain the fluoride catalysts in simple admixture or more complex forms of combination. The invention may be used for separating the fluoride catalyst in any of these forms. However, because of the relatively low boiling points of the fluorides, the invention assumes particular significance when one of the products of the reaction is gaseous and is mixed with a substantial amount of the catalyst in gaseous form. Because of this significance the invention will be described hereinafter in connection with illustrative examples in which the catalyst is in gaseous form.

The amines which may be used as the absorbent in accordance with the invention may be any of the aliphatic amines, aromatic amines or heterocyclic ring compounds containing nitrogen in the ring (with or without a hydrogen atom attached to the nitrogen), such as pyridine and its analogues, i. e., quinolines, coal tar bases, etc. Numerous examples can be given as illustrative of the invention, and the following may be mentioned: tetraethylene petamine, dimethylaniline, the amino diphenyls, and coal tar bases boiling above 570° F. Further examples of amines which may be used are phenylene diamine, toluidenes, benzyamine, methyl aniline, etc. Ammonia or aliphatic amines may be used, such as butyl amine, amyl amine, and dibutyl amine, but it would probably be harder to desorb, recover or liberate the fluorides from them, although this could be accomplished by properly adjusting temperature and pressure. Mixtures of two or more amines may be used and this is particularly desirable when the combination forms a low melting eutectic mixture. The particular amines to be selected will depend to some extent upon the fluoride, upon the material with which it is admixed and from which it must be separated, and upon the temperature, pressure and other operating conditions, etc. Certain of the amines are more efficient than others and more suitable because of their melting point, boiling point and other physical properties. However, this fact is not intended to be interpreted as limiting the invention to the most suitable of the amines, because the invention is applicable to the general class.

If it is desired, the amines may be mixed with any unreactive compound miscible with or soluble in the amine and having a sufficiently high boiling point not to be volatile at any of the temperatures employed in the recovery process. Such a mixture generally lowers the melting point in somewhat the same manner as a eutectic mixture of two or more amines, and permits the use of amines at a lower temperature in a liquid form.

Merely as illustrative, the invention will be described as applied to one of its most significant variations in which the catalysts leave the reaction zone as a gas in a gaseous mixture. The absorbing operation may be carried out in any manner in which the gaseous catalyst-containing phase is brought into intimate contact with the amine absorbent in the liquid phase. The temperature suitable for this absorption may be any from room temperature or higher or lower temperatures, up to that at which the equilibrium between the absorption and the desorption, recovery or liberation renders the operation too inefficient to be of value. Preferably the temperature should be such that the amine is liquid. In general the absorption temperature may extend to 300° F. In many instances, temperatures up to about 212° F. may be used, since this and temperatures below it are readily obtained with steam at atmospheric pressure. The temperature of absorption to be used commercially would be that closest to the desorption temperature required, which may well be that reached by contacting the hot amine with the cold catalyst-rich gas.

The temperature at which the desorption is carried out, i. e., the operation in which the fluoride is separated from the amine in which it is absorbed, may be any temperature above that used for the absorption up to the boiling point of the amine, or any diluents therein or any other components of the absorbent. The range extends from about 200 to 300° F. up to the boiling point of the amine absorbent.

The pressure used during the absorption and desorption is not particularly critical and may vary from a high vacuum to 1000 pounds per square inch or more depending upon the nature of the process to which the process is applied. It is immaterial that some or all of the components in the absorbing or in the desorbing or liberating zone are liquefied under the pressure used. In some instances the desorption may be carried out advantageously under a vacuum.

Merely as illustrative of an absorption or desorption operation, the process may be practised with o-amino diphenyl as the absorbent. One mol of the o-amino diphenyl (169 g.) was heated to a temperature slightly above its melting point and 19 g. (0.95 mol) of hydrogen fluoride was absorbed in the amine. The amine-hydrofluoride complex formed was then transferred from the absorption zone to the desorption zone and the complex heated to about 480° F. The efficiency of the absorption and desorption could be determined by a fluorine analysis of the absorbent complex and the absorbent remaining after the desorption operation. Such analysis shows that the fat absorbent contains 12.3% fluorine. After the desorption operation is carried out the denuded absorbent contains 2.59% fluorine. These data represent a 79% removal of hydrogen fluoride in a single pass. While the denuded absorbent is not entirely freed of hydrogen fluoride, the amount removed in the desorbing operation renders the denuded absorbent available to absorb further hydrogen fluoride and it may be recycled in a continuous operation.

As another illustrative example, a "Reilly" coal tar base was fractionated and the fraction boiling above 570° F. was used as an absorbent. The compounds in the absorbent are probably quinoline derivatives having the basic structure:

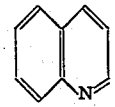

In practicing the invention with a higher boiling coal tar base, it was possible to absorb 9.0 g. (approximately 0.45 mol) hydrogen fluoride in 89.0 g. (approximately 0.5 mol) of the absorbent. 80 g. of the resulting amine-hydrofluoride complex was heated to 525° F. and 9 g. of hydrogen fluoride was desorbed. A fluorine analysis showed 8.4% fluorine in the amino-hydrofluoride complex after absorption and 1.4% fluorine after the desorption. This represents an efficiency of 83% removal of the hydrogen fluoride in a single pass.

When the invention is applied to the separation of boron trifluoride substantially the same amines and conditions may be used as are used in separating hydrogen fluoride.

As illustrative of an application of my invention to the recovery of boron trifluoride, dimethyl aniline was used as the absorbent and 0.75 mol of the amine was found to absorb 0.752 mol of boron trifluoride at about room temperature. Upon heating the absorbent complex to 460° F. a substantial portion of the boron trifluoride was evolved from the absorbent and could be recovered for re-use. The denuded amine absorbent can be returned to the process to absorb an additional quantity of boron trifluoride.

The invention may be applied readily to a continuous process utilizing an apparatus having absorption and desorption zones. The absorbent is introduced into and passed through the absorbing zone. The gaseous product or component of the reaction with which the fluoride is admixed may be passed through the absorption zone preferably counter current to the absorbent. The absorbent then flows or is moved to the desorption zone. The absorbent after being desorbed may be cooled and returned to the absorbing zone and thus continuously recycled.

In the above illustrative examples the process has been carried out at substantially atmospheric pressure. When higher or lower pressures are used, it may be desirable to use correspondingly higher or lower temperatures because of the higher or lower boiling points of the absorbent at such different pressures and the higher or lower desorption temperatures of the complex under higher or lower pressures.

While the invention has been illustrated with reference to several amines found to be particularly suitable, and the preferred temperatures are given that are especially suitable for use therewith, it will be understood that other amines could be used with correspondingly greater or lesser efficiency as explained heretofore when using such other amines for absorption. The temperature of the operation should be selected with reference to the melting or boiling points of the amine absorbent, the absorbent and desorbent equilibrium characteristics, the pressures used, and other factors as will be apparent to one skilled in the art in the light of the explanation and disclosures herein.

The invention is of particular value in connection with a recovery of hydrogen fluoride and boron trifluoride in gaseous form and for this reason the invention has been described particularly with reference to the fluorides in this form. But it is to be understood that the invention is not limited to such an operation because under appropriate conditions a liquid phase operation may be used.

The invention is applicable to the recovery of the fluorides from any compound or composition with which they may be admixed, the only limitation in this regard being that the compound or composition with which the fluoride is admixed should not form a complex or otherwise react with the amine absorbent. This invention is particularly applicable to the separation of the fluorides from normally gaseous saturated or unsaturated hydrocarbons with which the fluorides are admixed.

The fluorides which may be absorbed or desorbed in accordance with the invention have been designated as hydrogen fluoride and boron trifluoride because these are of significance commercially in the catalytic field. However, it is believed that any fluoride which is volatile under the conditions of the process may be treated similarly.

The fluorides have been referred to as catalysts in the description of the invention because that is their principal present use. However, it will be appreciated that the invention is not necessarily limited to the recovery of fluorides in connection with a process in which they have been used as catalysts. They may be recovered from any other process, such as a process of purification or processes in which the fluorides are a reacting component or a final product.

Reference is made to the co-assigned application of Everett C. Hughes et al., Serial No. 471,456, which claims the absorption and recovery of fluorides in amines of a specified low basicity.

It will be understood that the invention is capable of many applications and modifications and it is not to be limited by any illustrative examples or other preferred forms described herein except as required in the following claims.

I claim:

1. The method of recovering a volatile fluoride, which comprises absorbing the fluoride in an amine, and subsequently recovering the fluoride from said amine by heating said amine and fluoride absorbed therein to liberate the fluoride therefrom without chemical modification of the compound other than any that may occur in said heating.

2. The method of recovering a volatile fluoride, which comprises absorbing the fluoride in an amine in liquid form, and subsequently heating the amine in which the volatile fluoride is absorbed to liberate the fluoride from the amine.

3. The method of recovering hydrogen fluoride, which comprises absorbing the hydrogen fluoride in an amine in liquid form, and subsequently heating the amine in which the hydrogen fluoride is absorbed to liberate the hydrogen fluoride from the amine.

4. The method of recovering boron trifluoride, which comprises absorbing the boron trifluoride in an amine in liquid form, and subsequently heating the amine in which the boron trifluoride is absorbed to liberate the boron trifluoride from the amine.

5. A method of recovering a volatile fluoride which comprises contacting said fluoride with an amine in an absorbing zone, withdrawing the amine and absorbed fluoride from the absorbing zone and introducing it into a fluoride recovery zone, heating the amine to remove the fluoride from the amine in said recovery zone, and returning the denuded amine to the absorbing zone.

6. The method of recovering hydrogen fluoride which comprises contacting a material containing the hydrogen fluoride with an amine to absorb at least a part of the hydrogen fluoride, and heating said amine containing the absorbed hydrogen fluoride to liberate at least a part of the hydrogen fluoride therefrom.

7. The method of recovering boron trifluoride which comprises contacting a material containing the boron trifluoride with an amine to absorb at least a part of the boron trifluoride, and heating said amine containing the absorbed boron trifluoride to liberate at least a part of the boron trifluoride therefrom.

8. The method of recovering a volatile fluoride, which comprises contacting a material containing the fluoride with tetraethylene pentamine to absorb at least a part of the fluoride, and heating said amine containing the absorbed fluoride to liberate at least a part of the fluoride therefrom.

9. The method of recovering a volatile fluoride, which comprises contacting a material containing the fluoride with amines comprised in a higher boiling coal tar base to absorb at least a part of the fluoride, and heating said amines containing the absorbed fluoride to liberate at least a part of the fluoride therefrom.

10. The method of recovering a volatile fluoride, which comprises contacting a material containing the fluoride with an amino diphenyl to absorb at least a part of the fluoride, and heating said amino diphenyl containing the absorbed fluoride to liberate at least a part of the fluoride therefrom.

11. A method of recovering hydrogen fluoride, which comprises contacting said hydrogen fluoride with an amine in an absorbing zone and at a temperature such that the amine is liquid, removing the amine and the absorbed hydrogen fluoride from the absorbing zone and introducing it into a fluoride recovery zone, heating the amine and absorbed hydrogen fluoride in said recovery zone to a temperature above that maintained in the absorbing zone to liberate the hydrogen fluoride from the amine.

12. A method of recovering boron trifluoride, which comprises contacting said boron trifluoride with an amine in an absorbing zone and at a temperature such that the amine is liquid, removing the amine and the absorbed boron trifluoride from the absorbing zone and introducing it into a fluoride recovery zone, heating the amine and absorbed boron trifluoride in said recovery zone to a temperature above that maintained in the absorbing zone to liberate the boron trifluoride from the amine.

13. A method of recovering a fluoride selected from the group consisting of hydrogen fluoride and boron trifluoride, which comprises contacting said fluoride with an amine in an absorbing zone and at a temperature such that the amine is liquid, removing the amine and the absorbed fluoride from the absorbing zone and introducing it into a fluoride recovery zone, heating the amine and absorbed fluoride in said recovery zone to a temperature above that maintained in the absorbing zone to liberate the fluoride from the amine, and returning the denuded amine to the absorbing zone.

14. A method of recovering fluorides from a catalyst comprising a fluoride selected from the group consisting of hydrogen fluoride and boron trifluoride, from a gaseous hydrocarbon containing phase with which said catalyst is admixed as a result of a catalytic process of treating hydrocarbons; which method comprises passing said hydrocarbon and catalyst containing mixture through an absorbing zone in contact with an amine at a temperature such that the amine is liquid; separately removing from the absorbing zone, the amine in which the fluoride is absorbed, and the fluoride freed hydrocarbon phase; introducing the amine and the fluoride into a fluoride recovery zone at a higher temperature than in said absorbing zone to release the fluoride from the amine.

15. A method of recovering a catalyst comprising hydrogen fluoride, from a hydrocarbon containing phase with which said catalyst is admixed as a result of a catalytic process of treating hydrocarbons; which method comprises passing said hydrocarbon and catalyst containing mixture through an absorbing zone in contact with an amine comprising o-aminodiphenyl at a temperature such that said amine is liquid; separately removing from the absorbing zone, the amine in which the fluoride is absorbed, and the fluoride freed hydrocarbon phase; introducing the amine and the fluoride into a fluoride recovery zone at a higher temperature than in said absorbing zone to release the fluoride from the amine.

16. A method of recovering a catalyst comprising hydrogen fluoride, from a hydrocarbon containing phase with which said catalyst is admixed as a result of a catalytic process of treating hydrocarbons; which method comprises passing said hydrocarbon and catalyst containing mixture through an absorbing zone in contact with the amines comprised in a higher boiling coal tar base at a temperature such that the amines are liquid; separately removing from the absorbing zone, the amines in which the fluoride is absorbed, and the fluoride freed hydrocarbon phase; introducing the amines and the fluoride into a fluoride recovery zone at a higher temperature than in said absorbing zone to release the fluoride from the amine.

17. A method of recovering a catalyst comprising boron trifluoride, from a hydrocarbon containing phase with which said catalyst is admixed as a result of a catalytic process of treating hydrocarbons; which method comprises passing said hydrocarbon and catalyst containing mixture through an absorbing zone in contact with dimethylaniline at a temperature such that said dimethylaniline is liquid; separately removing from the absorbing zone, the dimethylaniline in which the fluoride is absorbed, and the fluoride freed hydrocarbon phase; introducing the dimethylaniline and the fluoride into a fluoride recovery zone at a higher temperature than in said absorbing zone to release the fluoride from the dimethylaniline.

18. A method of recovering fluorides from a catalyst comprising a fluoride selected from the group consisting of hydrogen fluoride and boron trifluoride, from a gaseous hydrocarbon containing phase with which said catalyst is admixed as a result of a catalytic process of treating hydrocarbons; which method comprises passing said hydrocarbon and catalyst containing mixture through an absorbing zone in contact with an amine at a temperature such that the amine is liquid; separately removing from the absorbing zone, the amine in which the fluoride is absorbed, and the fluoride freed hydrocarbon phase; introducing the amine and the fluoride into a fluoride recovery zone and applying heat to maintain said recovery zone at a temperature higher than in the absorbing zone and to release the fluoride from the amine; returning the denuded amine to the absorbing zone to absorb the fluoride from an additional quantity of the hydrocarbon and catalyst containing phase; and returning the released fluoride to the catalytic hydrocarbon treating process.

19. A method of recovering fluorides from a catalyst comprising a fluoride selected from the group consisting of hydrogen fluoride and boron trifluoride, from a gaseous hydrocarbon containing phase with which said catalyst is admixed as a result of a catalytic process of treating hydrocarbons; which method comprises passing said hydrocarbon and catalyst containing mixture through an absorbing zone in contact with an amine at a temperature at least such that the amine is liquid, and up to 300° F.; separately removing from the absorbing zone, the amine in which at least a part of the fluoride is absorbed, and the fluoride freed hydrocarbon phase; introducing the amine and the fluoride into a fluoride recovery zone and applying heat to maintain said recovery zone at a temperature higher than in the absorbing zone and not more than the boiling point of the amine under the recovery conditions and to release at least a part of the fluoride from the amine; returning the denuded amine to the absorbing zone to absorb the fluoride from an additional quantity of the hydrocarbon and catalyst containing phase; and returning the released fluoride to the catalytic hydrocarbon treating process.

ROBERT E. BURK.